United States Patent
Zhang et al.

(10) Patent No.: US 11,789,864 B2
(45) Date of Patent: *Oct. 17, 2023

(54) FLUSH METHOD FOR MAPPING TABLE OF SSD

(71) Applicant: YANGTZE MEMORY TECHNOLOGIES CO., LTD., Wuhan (CN)

(72) Inventors: Lei Zhang, Wuhan (CN); Keke Ding, Wuhan (CN); Li Wei Wang, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,985

(22) Filed: May 26, 2022

(65) Prior Publication Data

US 2022/0283937 A1    Sep. 8, 2022

Related U.S. Application Data

(63) Continuation of application No. 16/929,054, filed on Jul. 14, 2020, now Pat. No. 11,379,361, which is a continuation of application No. PCT/CN2020/091895, filed on May 22, 2020.

(51) Int. Cl.
| | |
|---|---|
| *G06F 12/00* | (2006.01) |
| *G06F 12/02* | (2006.01) |
| *G06F 9/30* | (2018.01) |
| *G06F 11/30* | (2006.01) |

(52) U.S. Cl.
CPC ...... *G06F 12/0292* (2013.01); *G06F 9/30047* (2013.01); *G06F 11/3037* (2013.01); *G06F 12/0246* (2013.01); *G06F 2212/214* (2013.01)

(58) Field of Classification Search
None
See application file for complete search history.

(56) References Cited

U.S. PATENT DOCUMENTS

| | | | |
|---|---|---|---|
| 11,379,361 B2* | 7/2022 | Zhang | G06F 11/3037 |
| 2014/0244917 A1 | 8/2014 | Maheshwari | |
| 2016/0283136 A1* | 9/2016 | Oe | G06F 3/0649 |
| 2017/0017570 A1 | 1/2017 | Yeh | |
| 2017/0083436 A1 | 3/2017 | Jung | |
| 2019/0188124 A1* | 6/2019 | Ferrante | G06F 12/0246 |
| 2020/0151108 A1 | 5/2020 | Yen | |

FOREIGN PATENT DOCUMENTS

| | | |
|---|---|---|
| CN | 105677236 A | 6/2016 |
| CN | 106775436 A | 5/2017 |
| CN | 110275678 A | 9/2019 |
| CN | 110895448 A | 3/2020 |
| TW | 201729195 A | 8/2017 |
| TW | 201907311 A | 2/2019 |

* cited by examiner

*Primary Examiner* — Daniel D Tsui
(74) *Attorney, Agent, or Firm* — BAYES PLLC

(57) ABSTRACT

A method of operating a Solid-State Drive (SSD) includes determining optimized thresholds of each corresponding segments according to their frequency of use, and executing a flush operation to write the one of the corresponding segments into a memory device according to the optimized thresholds of the corresponding segments.

18 Claims, 4 Drawing Sheets

FIG. 1

FLUSH METHOD FOR MAPPING TABLE OF SSD

CROSS-REFERENCE TO RELATED APPLICATIONS

This application is a continuation of U.S. application Ser. No. 16/929,054, filed on Jul. 14, 2020, issued as U.S. Pat. No. 11,379,361, which is a continuation of International Application No. PCT/CN2020/091895, filed on May 22, 2020, both of which are incorporated herein by reference in their entireties.

BACKGROUND

The present disclosure relates to a solid-state drive (SSD) and a flush method for a mapping table of the SSD, and more particularly, to a flush method capable of reducing the unnecessary segment flush operation and the restoring time for the mapping table of the SSD.

SUMMARY

The present disclosure provides a flush method which is capable of reducing unnecessary segment flush operation and mitigating written bandwidth and WAF problem.

In one aspect, a method of operating a Solid-State Drive (SSD) includes determining optimized thresholds of each corresponding segments according to their frequency of use, and executing a flush operation to write the one of the corresponding segments into a memory device according to the optimized thresholds of the corresponding segments.

In some implementations, executing the flush operation to write the one of the corresponding segments into the memory device according to the optimized thresholds of the corresponding segments includes, executing the flush operation to write the one of the corresponding segments into the memory device in response to the one of the count values of the corresponding segments is greater than the one of the optimized thresholds of the corresponding segments, wherein the count value increases by 1 in response to each of Logical Block Addresses (LBAs) being written into a mapping table.

In some implementations, the method further includes generating the mapping table comprising the LBAs, generating a recording table configured to record each of the count values of the corresponding segments, and before executing the flush operation, determining whether one of the count values of the corresponding segment is greater than one of the optimized thresholds of the corresponding segment.

In some implementations, the recording table is further configured to: record a number of total written LBAs, wherein the number of total written LBAs increases by 1 in response to each of the LBAs being written into the mapping table.

In some implementations, each optimized threshold of corresponding segment is determined by an equation of:

$$O = \frac{B}{\left(1 - \frac{C}{T}\right)} = \frac{B \times T}{(T - C)},$$

where O is defined as one of the optimized thresholds, B is defined as a base threshold corresponding to the segments, C is defined as one of the count values of the corresponding segments, and T is defined as the number of total written LBAs.

In some implementations, the method further includes cleaning the recording table in response to the number of total written LBAs reaches a predetermined threshold count by resetting the multiple count values, the number of total written LBAs, and the optimized thresholds to zero.

In some implementations, the method further includes acquiring the recording table from the memory device after the SSD is powered on.

In another aspect, a solid-state drive (SSD) includes a memory device including a non-volatile memory configured to store a mapping table, and a memory controller including a control circuit configured to execute an instruction from a host to perform a flush process, wherein the flush process includes determining optimized thresholds of each corresponding segments according to their frequency of use, and executing a flush operation to write the one of the corresponding segments into a memory device according to the optimized thresholds of the corresponding segments.

In some implementations, executing the flush operation to write the one of the corresponding segments into the memory device according to the optimized thresholds of the corresponding segments includes, executing the flush operation to write the one of the corresponding segments into the memory device in response to the one of the count values of the corresponding segments is greater than the one of the optimized thresholds of the corresponding segments, wherein the count value increases by 1 in response to each of Logical Block Addresses (LBAs) being written into a mapping table.

In some implementations, the flush process further includes generating the mapping table comprising the LBAs, generating a recording table configured to record each of the count values of the corresponding segments, and before executing the flush operation, determining whether one of the count values of the corresponding segment is greater than one of the optimized thresholds of the corresponding segment.

In some implementations, the recording table is further configured to: record a number of total written LBAs, wherein the number of total written LBAs increases by 1 in response to each of the LBAs being written into the mapping table.

In some implementations, each optimized threshold of corresponding segment is determined by an equation of:

$$O = \frac{B}{\left(1 - \frac{C}{T}\right)} = \frac{B \times T}{(T - C)},$$

where O is defined as one of the optimized thresholds, B is defined as a base threshold corresponding to the segments, C is defined as one of the count values of the corresponding segments, and T is defined as the number of total written LBAs.

In some implementations, the non-volatile memory comprises NAND flash or NOR flash.

In some implementations, the memory controller further includes a cache memory including Dynamic Random Access Memory (DRAM) or Static Random-Access Memory (SRAM).

In some implementations, the cache memory is configured to store a temporary mapping table, and the mapping table is updated according to the temporary mapping table.

In some implementations, the cache memory is configured to store a temporary recording table, and the recording table is updated according to the temporary recording table.

In yet another aspect, a system includes a host comprising a host memory and a host processor, a memory device comprising a non-volatile memory configured to store a mapping table; and a memory controller comprising a control circuit configured to execute an instruction from the host to perform a flush process, wherein the flush process includes, determining optimized thresholds of each corresponding segments according to their frequency of use, and executing a flush operation to write the one of the corresponding segments into a memory device according to the optimized thresholds of the corresponding segments.

In some implementations, executing the flush operation to write the one of the corresponding segments into the memory device according to the optimized thresholds of the corresponding segments includes executing the flush operation to write the one of the corresponding segments into the memory device in response to the one of the count values of the corresponding segments is greater than the one of the optimized thresholds of the corresponding segments, wherein the count value increases by 1 in response to each of Logical Block Addresses (LBAs) being written into a mapping table.

In some implementations, the flush process further includes generating the mapping table comprising the LBAs, generating a recording table configured to record each of the count values of the corresponding segments, and before executing the flush operation, determining whether one of the count values of the corresponding segment is greater than one of the optimized thresholds of the corresponding segment.

In some implementations, the LBAs are transmitted from the host memory.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

FIG. 1 is a schematic diagram of a mapping table of an SSD.

The present disclosure will be described with reference to the accompanying drawings.

DETAILED DESCRIPTION

Figure 2:
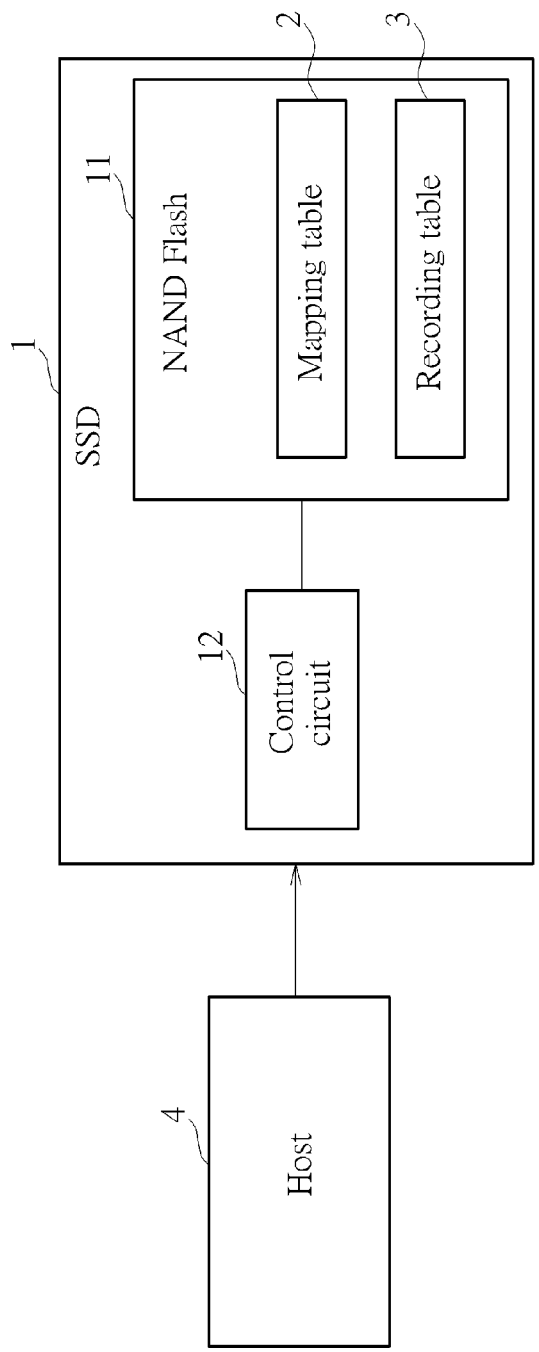
FIG. 2 is a schematic diagram of an SSD according to an embodiment of the present disclosure.

Please refer to FIG. 2, which is a schematic diagram of an SSD 1 according to an embodiment of the present disclosure. The SSD 1 is coupled to a host 4 and comprises a NAND flash 11 and a control circuit 12. The NAND flash 11 stores a mapping table 2 and a recording table 3. The mapping table 2 comprises multiple segments Seg0 to Seg19; in other words, the mapping table 2 is divided into the multiple segments Seg0 to Seg19. The SSD 1 maps a group of data, e.g. multiple logical block addresses (LBAs), of the host 4 to the multiple segments Seg0 to Seg19. The recording table 3 records a total value and multiple count values corresponding to the multiple segments Seg0 to Seg19. The control circuit 12 is coupled to the NAND flash 1 and acquires the recording table 3 from the NAND flash 11 after the SSD 1 is powered on.

Figure 3:
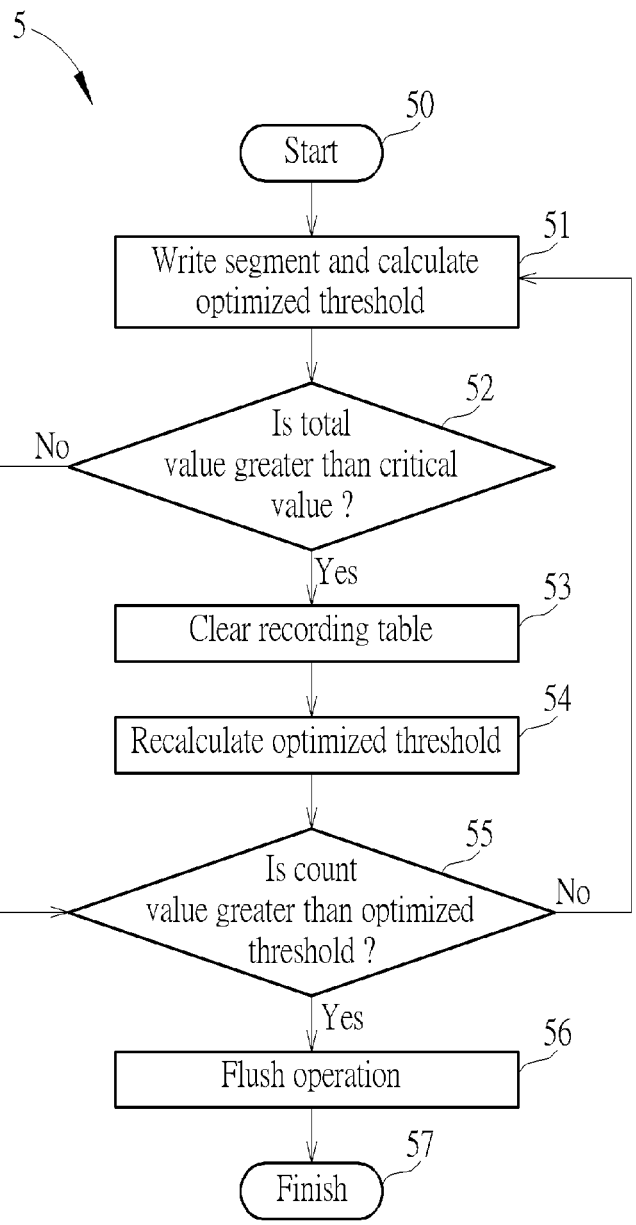
FIG. 3 is a flowchart of a flush process according to an embodiment of the present disclosure.

To flush the mapping table 2, the control circuit 12 is configured to execute a flush operation, which may be summarized as a flush process 5, as shown in FIG. 3. The flush process 5 comprises the following steps.

Step 50: Start.

Step 51: When one of the data (LBAs) is written by the host 4, increasing one of the multiple count values corresponding to one of the multiple segments of the one of the data by 1, increasing the total value by 1, and calculating one of multiple optimized thresholds corresponding to the one of the multiple count values.

Step 52: Determining whether the total value is greater than a critical value. If yes, go to step 53; else, go to step 55.

Step 53: Cleaning the recording table 3 and allowing the multiple count values, the total value and the multiple optimized thresholds to go to zero.

Step 54: Recalculating the one of the multiple optimized thresholds corresponding to the one of the multiple count values.

Step 55: Determining whether the one of the multiple count values is greater than the one of multiple optimized thresholds corresponding to the one of the multiple count values. If yes, go to step 56; else, go to step 51.

Step 56: Executing a flush operation to write the one of the multiple segments into the NAND flash 11 and restoring the mapping table 2.

Step 57: Finish.

$$O = \frac{B}{\left(1 - \frac{C}{T}\right)} = \frac{B \times T}{(T - C)}$$

where O is defined as one of the multiple optimized thresholds, B is defined as one of multiple base thresholds corresponding to the multiple segments, C is defined as one of the multiple count values, and T is defined as the total value.

Therefore, as known from step 55 and step 56, if the optimized threshold O is greater, the flush frequency of the segments written into the NAND flash 11 is smaller. It may be seen from the equation that when the count value C is greater, the optimized threshold O is also greater, so the flush frequency of the segments would be smaller. That is, the flush frequency of the multiple segments Seg0 to Seg19 is inversely proportional to the count values C.

Figure 1:
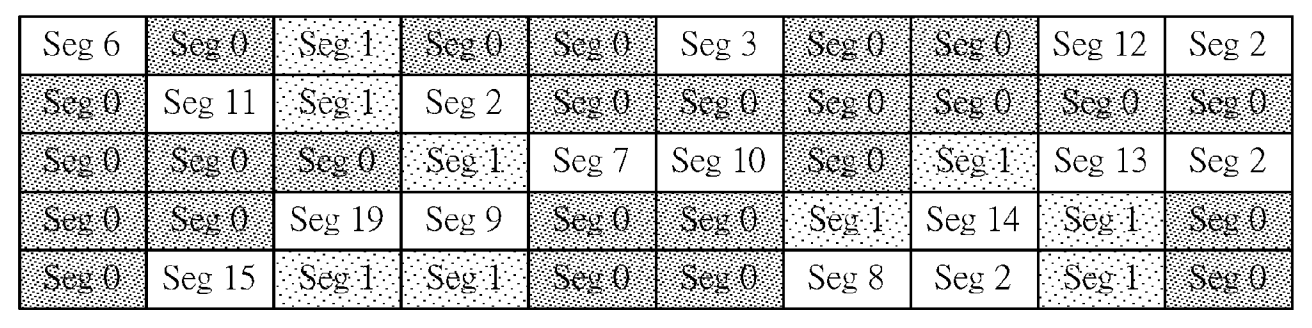
Figure 4:
FIG. 4 is a schematic diagram of a mapping table of an SSD according to an embodiment of the present disclosure.

In this way, the SSD 1 may let hot segments, e.g. Seg0 and Seg1, to be flushed less frequently, but let cold segments to be flushed more frequently. For example, please refer to FIG. 4, which is a schematic diagram of a mapping table for an SSD according to an embodiment of the present disclosure. The mapping table 2 only comprises 4 segments Seg0 and 3 segments Seg1 that are the hot segments. In comparison to FIG. 1, where the mapping table of the traditional SSD comprises 25 segments Seg0 and 9 segments Seg1 that are the hot segments, the SSD 1 of the embodiment may be capable of reducing unnecessary segment flush operation and the restoring time.

It is worth noting that because the cold segments are flushed more often, the SSD 1 may reduce the possibility of losing data due to not updating the cold segments for a long time.

In step 52 and step 53, the SSD 1 may change inherent application mode due to different life cycles, different workloads and different writing scenarios, so the flush frequency of the segments Seg0 to Seg19 recorded and accumulated before may not reflect current utilization scenarios and habits. Therefore, when the total value reaches the critical value, e.g. a range of capacity of the NAND flash 11, the control circuit 12 cleans the recording table 3, which allows the multiple count values, the total value and the multiple optimized thresholds to go to zero.

In summary, the present disclosure provides an SSD and a flush method capable of reducing the unnecessary segment flush operation and the restoring time, and mitigating the written bandwidth and the WAF problem.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of operating a Solid-State Drive (SSD), comprising:
    determining first thresholds of each corresponding segments of a mapping table according to frequency of use of the segments, wherein the mapping table comprises Logical Block Addresses (LBAs), the LBAs are divided into multiple corresponding segments; and
    executing a flush operation to write the one of the corresponding segments of the mapping table into a memory device according to the first thresholds of the corresponding segments of the mapping table,
    wherein each first threshold of corresponding segment of the mapping table is determined by an equation of:

$$O = \frac{B}{\left(1 - \frac{C}{T}\right)} = \frac{B \times T}{(T - C)}$$

where O is defined as one of the first thresholds, B is defined as a base threshold corresponding to the segments of the mapping table, C is defined as one of count values of the corresponding segments of the mapping table, and T is defined as a number of total written LBAs.

2. The method of claim 1, wherein the count value corresponds to the number of the corresponding LBAs being written into the mapping table.

3. The method of claim 1, wherein executing the flush operation to write the one of the corresponding segments of the mapping table into the memory device according to the first thresholds of the corresponding segments of the mapping table comprises:
    executing the flush operation to write the one of the corresponding segments of the executing the flush operation to write the one of the corresponding segments of the mapping table into the memory device when a count value of the corresponding segments of the mapping table is greater than the first thresholds of the corresponding segments of the mapping table.

4. The method of claim 1, further comprising:
    recording each of the count values of the corresponding segment of the mapping table.

5. The method of claim 1, further comprising:
    recording the number of total written LBAs.

6. The method of claim 1, further comprising:
    generating a recording table configured to record each of the count values of the corresponding segments of the mapping table and the number of total written LBAs.

7. The method of claim 6, further comprising:
    in response to the number of total written LBAs reaches a predetermined threshold count, cleaning the recording table by resetting the count values, the number of total written LBAs, and the first thresholds to zero.

8. The method of claim 6, further comprising:
    acquiring the recording table from the memory device after the SSD is powered on.

9. A solid-state drive (SSD), comprising:
    a memory device comprising a non-volatile memory configured to store a mapping table, wherein the mapping table comprises Logical Block Addresses (LBAs), the LBAs are divided into multiple corresponding segments; and
    a memory controller configured to execute an instruction to perform a flush process, wherein the flush process comprises:
    determining first thresholds of each of the corresponding segments of the mapping table according to frequency of use the segments; and
    executing a flush operation to write the one of the corresponding segments of the mapping table into a memory device according to the first thresholds of the corresponding segments of the mapping table,
    wherein each first threshold of corresponding segment of the mapping table is determined by an equation of:

$$O = \frac{B}{\left(1 - \frac{C}{T}\right)} = \frac{B \times T}{(T - C)}$$

where O is defined as one of the first thresholds, B is defined as a base threshold corresponding to the segments of the mapping table, C is defined as one of count values of the corresponding segments of the mapping table, and T is defined as a number of total written LBAs.

10. The SSD of claim 9,
    wherein the count value corresponds to the number of the corresponding LBAs being written into the mapping table.

11. The SSD of claim 9, wherein executing the flush operation to write the one of the corresponding segments of the mapping table into the memory device according to the first thresholds of the corresponding segments of the mapping table further comprises:
    executing the flush operation to write the one of the corresponding segments of the executing the flush operation to write the one of the corresponding segments of the mapping table into the memory device when a count value of the corresponding segments of the mapping table is greater than the first thresholds of the corresponding segments of the mapping table.

12. The SSD of claim 9, wherein the flush process further comprises:

recording each of the count values of the corresponding segment of the mapping table.

13. The SSD of claim 9, wherein the flush process further comprises:
   recording the number of total written LBAs.

14. The SSD of claim 9, wherein the flush process further comprises:
   generating a recording table configured to record each of the count values of the corresponding segments of the mapping table and the number of total written LBAs.

15. The SSD of claim 14, wherein the flush process further comprises:
   in response to the number of total written LBAs reaches a predetermined threshold count, cleaning the recording table by resetting the count values, the number of total written LBAs, and the first thresholds to zero.

16. The SSD of claim 14, wherein the flush process further comprises:
   acquiring the recording table from the memory device after the SSD is powered on.

17. A system comprising:
   a host comprising a host memory and a host processor;
   a memory device comprising a non-volatile memory configured to store a mapping table; and
   a memory controller comprising a control circuit configured to execute an instruction from the host to perform a flush process, wherein the flush process comprises:
      determining first thresholds of each corresponding segments of the mapping table according to frequency of use of the segments, wherein the mapping table comprises Logical Block Addresses (LBAs), wherein the LBAs are divided into multiple corresponding segments; and
      executing a flush operation to write the one of the corresponding segments of the mapping table into a memory device according to the first thresholds of the corresponding segments of the mapping table,
   wherein each first threshold of corresponding segment of the mapping table is determined by an equation of:

$$O = \frac{B}{\left(1 - \frac{C}{T}\right)} = \frac{B \times T}{(T - C)}$$

where O is defined as one of the first thresholds, B is defined as a base threshold corresponding to the segments of the mapping table, C is defined as one of count values of the corresponding segments of the mapping table, and T is defined as a number of total written LBAs.

18. The system of claim 17,
   wherein the count value corresponds to the number of the corresponding LBAs being written into the mapping table.

* * * * *